March 16, 1971 N. L. HALL ET AL 3,570,056

MULTI-COLORED PLASTIC BUILDING PRODUCT AND ITS MANUFACTURE

Filed July 24, 1969 6 Sheets-Sheet 1

INVENTORS
NELSON LEE HALL
DONALD HILLMAN SLOCUM

BY Harry E. Braddock
ATTORNEY

MULTI-COLORED PLASTIC BUILDING PRODUCT AND ITS MANUFACTURE

Filed July 24, 1969

INVENTORS
NELSON LEE HALL
DONALD HILLMAN SLOCUM

BY Harry C. Braddock
ATTORNEY

MULTI-COLORED PLASTIC BUILDING PRODUCT AND ITS MANUFACTURE
Filed July 24, 1969
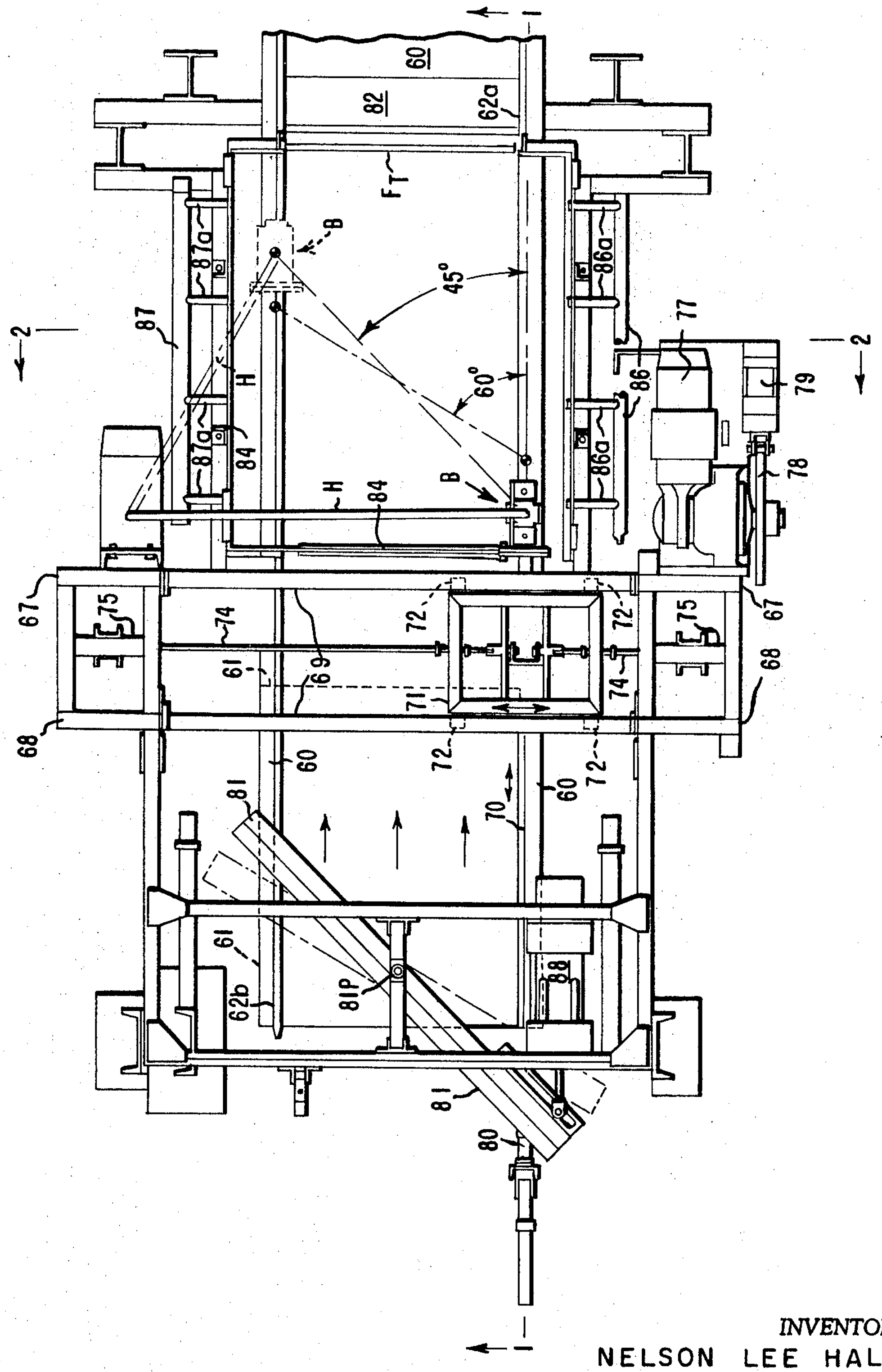
INVENTORS
NELSON LEE HALL
DONALD HILLMAN SLOCUM
BY Harry E. Braddock
ATTORNEY MULTI-COLORED PLASTIC BUILDING PRODUCT AND ITS MANUFACTURE
Filed July 24, 1969 6 Sheets-Sheet 4
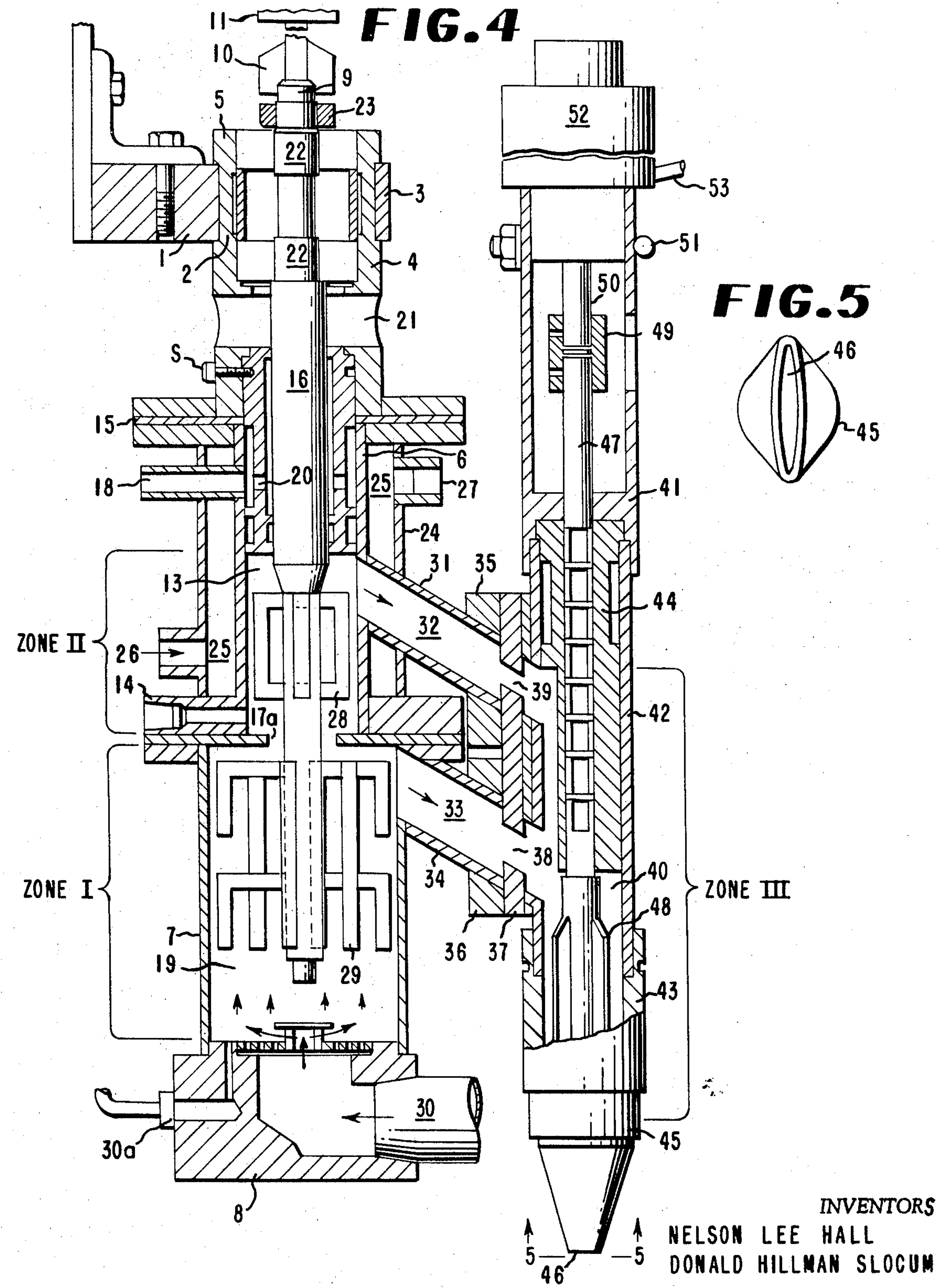
INVENTORS
NELSON LEE HALL
DONALD HILLMAN SLOCUM
BY Harry C. Braddock
ATTORNEY MULTI-COLORED PLASTIC BUILDING PRODUCT AND ITS MANUFACTURE
Filed July 24, 1969 6 Sheets-Sheet 5
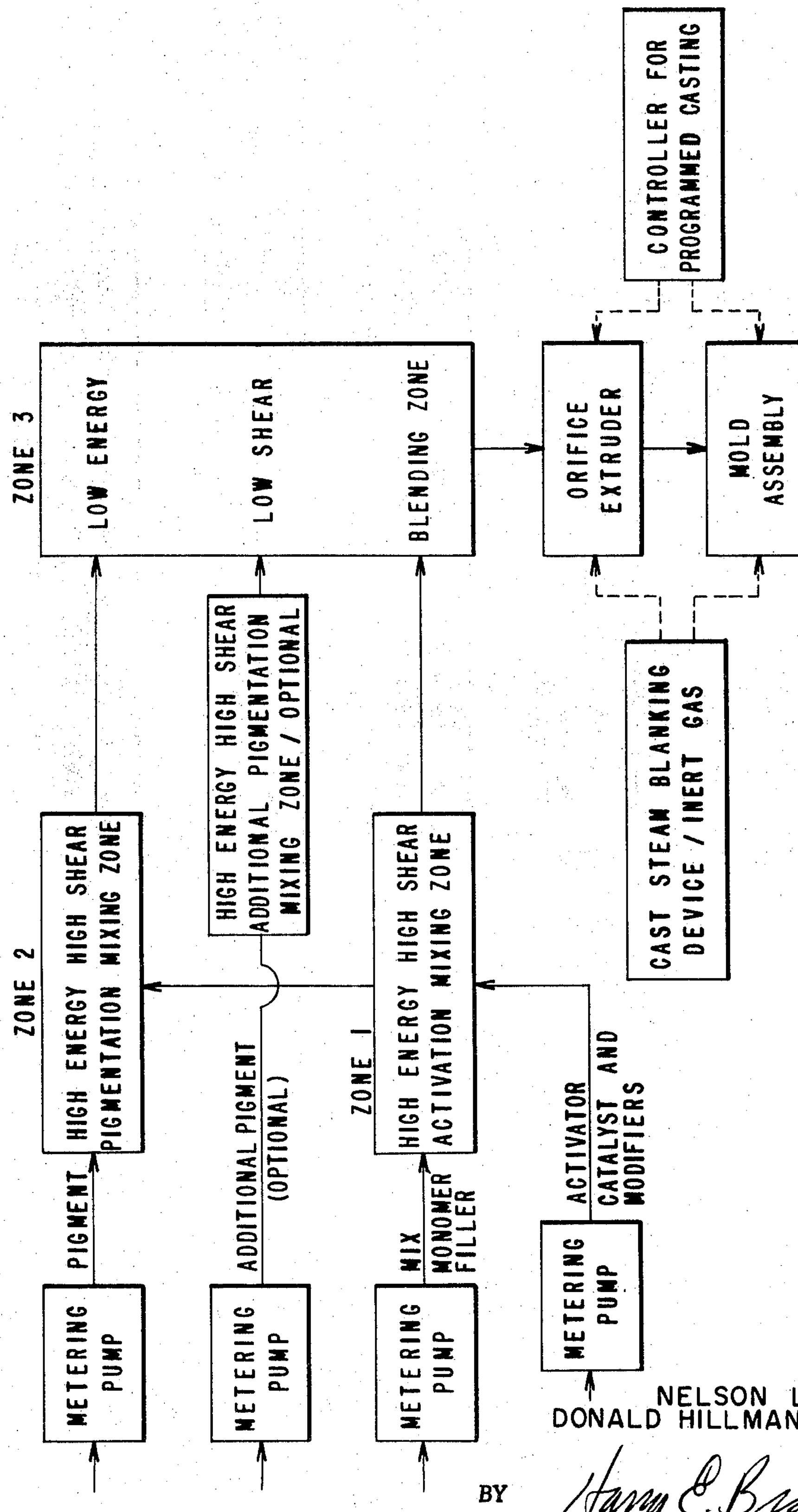
INVENTORS
NELSON LEE HALL
DONALD HILLMAN SLOCUM
BY Harry E. Braddock
ATTORNEY MULTI-COLORED PLASTIC BUILDING PRODUCT AND ITS MANUFACTURE
Filed July 24, 1969 6 Sheets-Sheet 6
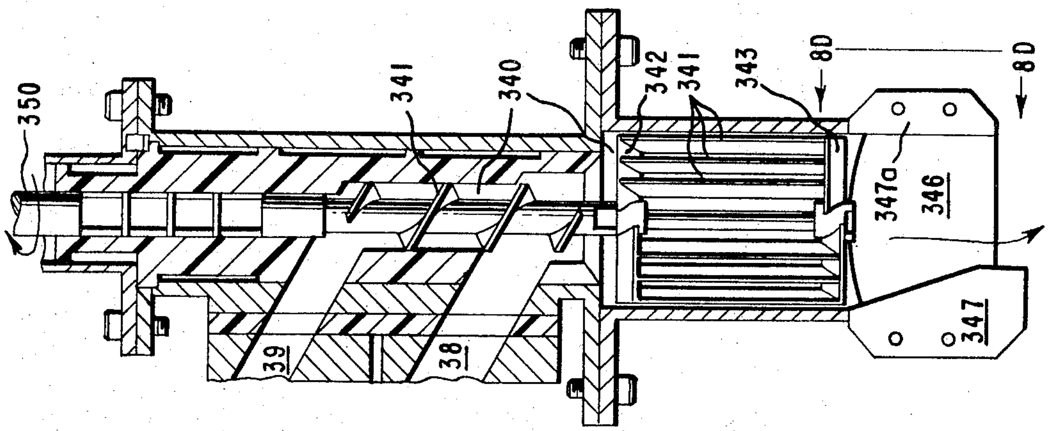
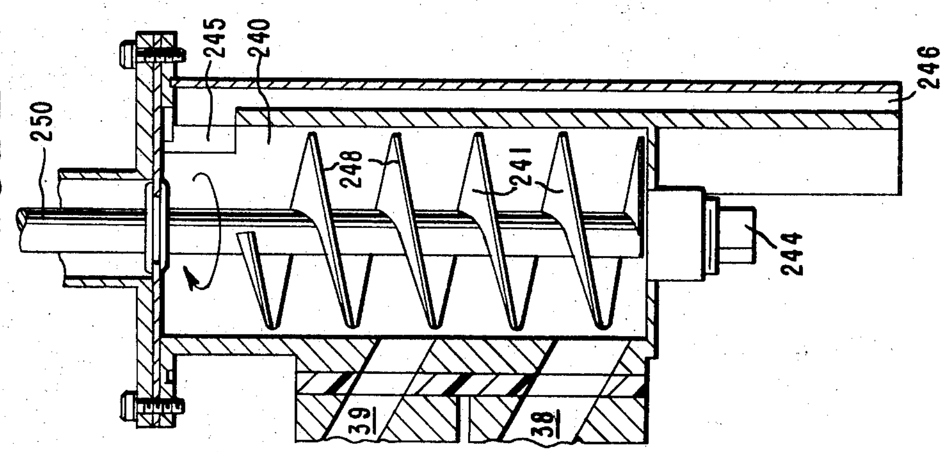
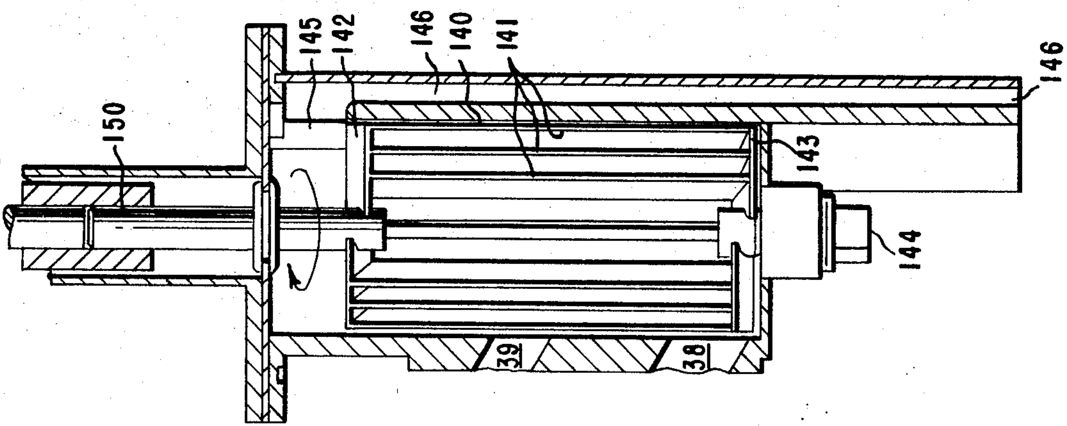
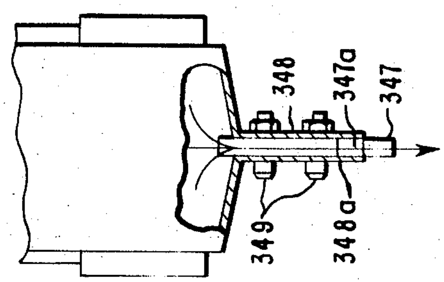
INVENTORS
NELSON LEE HALL
DONALD HILLMAN SLOCUM
BY Harry E. Braddock
ATTORNEY United States Patent Office 3,570,056 Patented Mar. 16, 1971

1

3,570,056

MULTI-COLORED PLASTIC BUILDING PRODUCT AND ITS MANUFACTURE

Nelson Lee Hall, Williamsville, N.Y., and Donald Hillman Slocum, Moorestown, N.J., assignors to E. I. du Pont de Nemours and Company, Wilmington, Del.
Filed July 24, 1969, Ser. No. 844,509
Int. Cl. B29c *9/00;* B29f *1/02, 1/12*
U.S. Cl. 18—4 8 Claims

ABSTRACT OF THE DISCLOSURE

A multi-colored cast plastic building product of uniformity and strength including a mass of polymeric material having distributed and suspended therein at least one smaller elongated continuous pattern of a different colored polymeric material in a predetermined reproducible three dimensional configuration and a manufacturing arrangement for producing the same so that the polymeric materials are substantially equally matched as to degree of polymerization at the time of being cast to give uniformity of all properties except color in the final product.

FIELD OF THE INVENTION

This invention relates generally to the field of improved multi-colored cast slabs, sheets, and articles useful in the building arts and having a predetermined controlled appearance and structure pleasingly similar in many cases to natural stone such as marble. Also involved are improved apparatus and process arrangements by which these products can be mass-produced commercially from certain polymeric compositions.

It is a general object of the invention to provide an improved building product with a predetermined appearance and structure, having highly uniform properties except for color and preferably generally similar to natural marble yet capable of controlled infinite variation and also capable of reproduction on a large commercial scale.

It is another general object to provide simple, economical, high speed, effective and reliable process and apparatus arrangements for commercial manufacture of the improved product of the invention, preferably of polymeric materials such as poly (methyl methacrylate) filled with calcium carbonate.

Other objects and advantages will be apparent from the following specification, claims, and accompanying drawings.

PRIOR ART BACKGROUND OF THE INVENTION

Multi-colored cast plastic articles simulating stone such as natural marble, and the processes and apparatus for making them are known in the prior art. Examples of such articles, some of which are made by incorporating colored pigments in highly filled resin bases are disclosed, together with their manufacturing arrangements to prior U.S. patents such as Nos. 1,120,632; 1,638,109; 2,040,-863; 2,280,488; 1,699,413; 1,845,457; 3,050,785; 2,174,-779; 3,422,175; 3,388,196; 2,477,170; and 3,396,067. It is believed that the closest prior art related to the present invention is represented by the above-identified related U.S. patent application to R. B. Duggins. In this item of prior art, a cast multi-colored sheet simulating marble with a predetermined reproducible three dimensional color pattern is described along with an arrangement for its manufacture. This sheet and its manufacture involved a relatively wide variation in time of curing or polymerizing compared with certain recently developed more accurately controllable uniformly rapid cure, or polymerization, systems especially adapted for highly filled polymers. With these more recent accurately predictable and accelerated

2 polymerization systems, and particularly at higher production rates, it has become of greater importance that the cast articles, which have a colored stream of polymeric material disposed throughout a base polymeric material of a different color, are produced under carefully controlled conditions such that all materials have substantially equally matched degrees of polymerization at the time of casting so the final product materials will be uniform in all properties except colors. Without this matching and uniformity in properties cast articles of the type exemplified by the prior art have had portions of unequal strength and sometimes develop undesirable warpage during the exothermic polymerization reaction by which they are produced. In order to produce these cast articles with better uniformity and strength and also handle satisfactorily the more recently developed rapid polymerizing materials, with their rapid heat generation and rapid increase in viscosity it was necessary to provide the new and improved process and apparatus arrangements described herein which possess features for achieving the equally matched degrees of polymerization throughout the product being cast and for achieving rapid economical handling of the highly viscous thixotropic rapidly polymerizing materials used. The novel apparatus and process features also contribute to a wider degree of variability in the colored patterns which can be produced and are believed to represent a valuable contribution to the art.

SUMMARY OF THE INVENTION

Generally stated the objects of the invention and the contribution to the art are achieved in the production of a castable flowable extruded colored stream of predetermined dimensions of rapidly polymerizing thixotropic material throughout which is plastically distributed at least one continuous separately identifiable smaller stream of rapidly polymerizing thixotropic material of a different color in a predetermined reproducible three dimensional configuration with the viscosities, densities, and degrees of polymerization of said streams being substantially equally matched to provide substantial uniformity of all properties except color throughout the final cast structure formed thereby.

Also involved in the achievement of the objects of the invention and the contribution to the art is a manufacturing arrangement of means and process steps in which controlled quantities of rapidly polymerizable materials are brought together, polymerization initiated, and the materials intimately mixed in a first confined zone of high shear mixing action, the mixed materials from the first zone are formed into first and second streams of rapidly polymerizing material of controlled relative sizes, one of said streams being conducted to a second zone of high shear mixing action where it is intimately mixed with a contrasting coloring material and then conducted to a third mixing zone of low intensity low shear mixing action and gently mixed with the other stream conducted there from the first high shear mixing zone. This low shear mixing action of the third zone progressively displaces the one stream with the contrasting coloring material throughout the other stream in at least one predetermined reproducible three dimensional configuration while substantially maintaining the continuity of the configurations of the one stream. The conditions, rates, dimensions and configurations of the streams, process, and apparatus are carefully established, controlled, and coordinated so that, in addition to producing the reproducible pattern or configuration of the contrasting colored material, with the rapidly polymerizing combined streams still in a flowable castable condition at the casting location, the materials of the combined streams are substantially equally matched as to density, viscosity, and degree of polymerization to give the desired uniformity of properties, excepting color, to the final product.

Other features and aspects of this general summary of the invention will appear hereinafter.

DESCRIPTION OF THE DRAWINGS

FIG. 3 is a partial plan view of the apparatus of FIGS. 1 and 2 with certain parts shown broken away for clearer showing.

FIG. 4 is an enlarged partial cross sectional view of the movable mixing and casting assembly of the apparatus shown in FIGS. 1, 2, and 3.

FIG. 5 is an enlarged end view of the extrusion orifice of the mixing and casting assembly taken at line 5—5 of FIG. 4.

FIG. 7 is a block diagram illustrating the general manufacturing process arrangement.

FIGS. 8A, 8B, and 8C are enlarged partial longitudinal cross sectional views showing alternate forms of the final zone low shear mixing component of the mixing and casting assembly shown in FIG. 5.

FIG. 8D is a partial elevational view of the component of FIG. 8C taken at line 8D—8D.

DETAILED DESCRIPTION OF THE INVENTION

Figure 1:
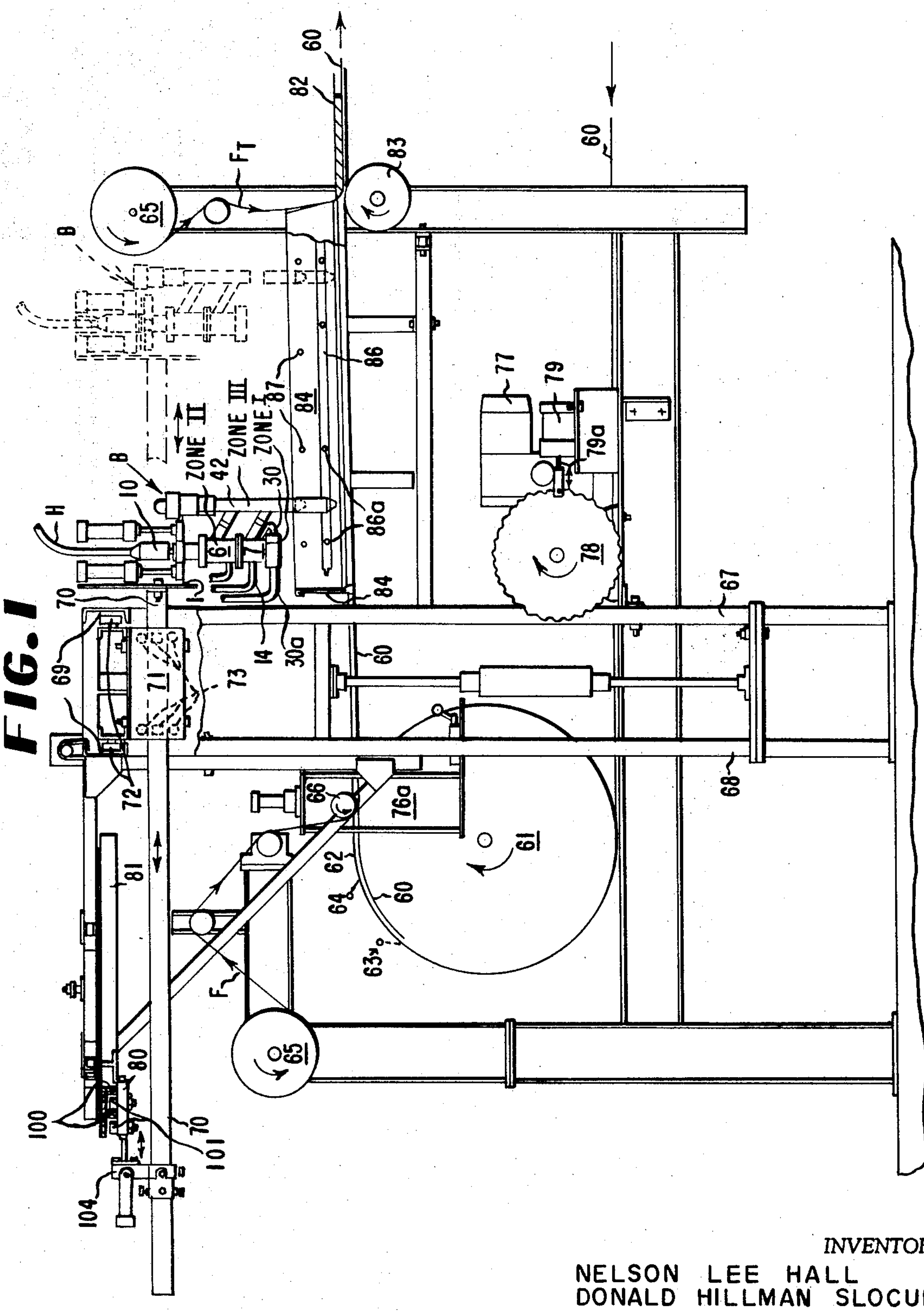
FIG. 1 is a partial longitudinal cross sectional view of an apparatus for producing cast articles embodying principles of the invention with certain parts shown broken away for a clearer showing. The view of FIG. 1 is taken at line 1—1 of FIG. 3.

The improved high speed high throughput process capable of continuously producing a uniformly strong, rigid, cast plastic structure useful in the building art and formed of a filled polymeric composition having pleasing multicolored structure and apparances resembling marble is illustrated in a block diagram in FIG. 7, and generally comprises the following basic steps:

Bringing together in a first reaction zone (Zone I) having predetermined dimensions, and under controlled conditions, monomer and polymer sirups, fillers, base colored pigments, catalysts, promoters, and modifiers; subjecting these materials to a high intensity intimate thorough mixing action under predetermined controlled conditions of a high shear mixing, temperature, and pressure to produce a homogeneous, uniformly colored, polymerizing mass; forming the thixotropic polymerizing mass into two flowable streams of predetermined relative size conducting one of the streams into at least one second confined zone (Zone II) having predetermined dimensions under controlled conditions of temperature and pressure while adding into Zone II at controlled rates at least one separate stream comprising coloring pigments to form a homogeneous colored mass which differs from the base color of Zone I; subjecting this mass in the second zone to a controlled high intensity, high order, high shear mixing action at predetermined controlled shear rates, temperatures and pressures, to intimately mix the colored pigments into the polymerizing mass, conducting this differently colored mass in a stream under predetermined controlled conditions of temperature and pressure, at predetermined flow rates from the second zone through a conduit of controlled length of predetermined size into a third zone (Zone III) having predetermined dimensions; while from Zone I, conducting the other stream from Zone I through a conduit of predetermined controlled length and size into Zone III; recombining the streams from Zones I and II in Zone III under controlled conditions of temperature, pressure, low order, low intensity, low shear mixing action similar to fold blending to form separately identifiable distinct vein patterns comprising at least one differently colored polymerizing stream progressively displaced in the base colored stream of polymerizing ingredients in a controlled predetermined general pattern of structure, the veins of polymerizing differently colored material having a degree of polymerization substantially equal to the degree of polymerization of the base colored material and preferably substantially equal in viscosity and density; extruding the combined streams from the third zone through an orifice of predetermined size and shape; and conducting the extruded streams under streamlined laminar flow conditions at controlled flow rates to a mold assembly to complete polymerization and/or cure.

The steps of bringing together in a single zone the necessary ingredients and causing high intensity high shear mixing action to produce a substantially homogeneous thixotropic low viscosity polymerizing mass which provides material for both the base colored stream and differently colored stream are important in accomplishing the eventual equal matching of the degrees of polymerization of the the streams and in maintaining high flow rates through the system. The following steps relating to the controlled addition and handling of the pigmented stream or streams are also important and significant so far as this invention is concerned. As mentioned above, the initial mass of polymerizing material is divided into two streams, one of which is conducted under controlled predetermined conditions of temperature and pressure, and at predetermined flow rates into a second and third mixing zone. Of considerable significance and benefit is the improvement achieved where as in Zone II a stream comprising differently colored pigment usually minor in size, is combined preliminarily with the one stream of polymerizing material of base color and is intimately mixed to provide at a later point (Zone III) a differently colored stream having substantially the same degree of polymerization as the other stream of base colored polymerizing material moving directly from Zone I and which differently colored stream is to be folded within the other stream in the third low intensity mixing zone (Zone III). It has been found that one preferred and practical way of matching these polymerization rates is to divide the initially formed polymerizing mass into two streams and then to divert one polymerizing stream to incorporate therein a different veining color and thereafter recombine the streams, the age, velocities, sizes, temperatures and other conditions of the separated streams being carefully controlled in a predetermined manner such that their degrees of polymerization and preferably their rates of polymerization, densities, and viscosities are substantially equally matched when recombined. As the differently colored polymerizing stream or streams are folded into the other base colored polymerizing material in Zone III they are progressively displaced therethrough in at least one predetermined reproducible three-dimensional configuration with the integrity and continuity of a colored stream substantially maintained. The recombined streams, while still flowable, are extruded as a single stream through an orifice in the structure defining Zone III at predetermined flow rates and under streamlined flow conditions prior to entering a mold assembly. The flow rates, conditions and dimensions of the extruded material and its orifice are controlled so that the extruded composite stream comprises at least one differently colored vein or stream, of polymerizing material with its integrity still maintained, distributed throughout the other base-colored polymerizing material in a predetermined, repetitive, reproducible, three-dimensional, irregular pattern having predetermined color relationship to the other base colored polymerizing material.

The final step involves directing the flowable extruded composite veined polymerizing stream to a mold assembly in a predetermined controlled manner, preferably under the control of suitable movement programming devices operated in accordance with stored control signals, and permitting the material to undergo curing or solidification within a limited predetermined controlled time period.

The features and controls of the above-described process are directed toward bringing together differently colored streams but otherwise of substantially equally matched properties of a compatible resin system with low shear, low intensity mixing such that when placed in a mold assembly they will (1) maintain the individual color characteristics, and (2) undergo curing of substantially the same rate under the same temperature conditions. It is therefore necessary, especially in Zones I and II, to control pressure, temperature and degree of mixing such that the polymerizing system does not overheat in the case of exothermic reactions and does not become excessively viscous in the case of thixotropic rapidly gelling resins. Since most commonly used resins, such as poly(methylmethacrylate) and polyester resins, form gels which undergo a viscosity change with increased agitation, especially under high shear mixing characteristics, it is necessary to keep the zones completely filled. Therefore, the pressure in each zone and related conduits must be maintained high enough, to achieve fast flow through the system, such that cavitation and its resulting undesirable effects of poor mixing and the formation of gas bubbles is not permitted to occur. In the case of exothermic reactions it may be desirable to transfer heat to or from one or both of the polymerizing streams to control its polymerization rate relative to the other stream to assist in achieving the condition of substantially equally matched degrees of polymerization when the streams are recombined. Flow rates must be controlled such that the material moves through the high intensity device at a rate fast enough to prevent the formation of highly viscous masses before the combined streams reach the extrusion point. Under predetermined controlled conditions established in the preferred system the moving streams of thixotropic polymerizing materials maintain high flow velocity characteristics of a low viscosity liquid while passing through the device, and this makes possible good orifice control and the accuracy of volumetric mixing at Zone III in addition to high throughput with minimum pumping power.

As will be recognized by those skilled in the art the size of the apparatus and the relative sizes of the conduits, mixing zones, agitation blades, etc. are dependent upon the volume of product being cast on a mold assembly in any given period of time. Within any one set of sizes or casting rates the apparatus will be controlled as to the relative sizes and dimensions interrelating Zones I, II and III and their cooperating conduits in a manner dictated by fluid dynamics and the vein pattern desired in the final cast article.

In the process of this invention the viscosity of the polymerizing filled basic colored material and the viscosity of the contrasting colored pigment streams must be substantially equally matched within certain limits in order to better control the structure and appearance of the vein or colored vein pattern and properties of the cast articles. In the case of poly(methylmethacrylate) the base colored polymerizing stream and the differently colored stream, both of which contain catalysts, modifier, promoter and filler, are in the range of 30 to 75 poises and preferably 44 to 64 poises at the time of mixing in Zone III. (Viscosities are measured with a standard Brookfield viscometer using spindle No. LV4, at 60 r.p.m.)

The viscosity of the small stream comprising the differently colored pigment which provide the contrasting color, which small stream is injected into the second high intensity mixing zone, usually lies within the range of .9–3 poises but is not in itself critical to the invention.

It has been found desirable and feasible (1) to control the size of the differently colored streams, or veins in the final product by regulating the size and type of mixing paddles and/or agitator blades used in Zone III; (2) to control the size of the differently colored stream as it enters Zone III; (3) to control the depth and degree of shear in mixing the differently colored stream with the basic stream and, (4) if desired, to further control the vein construction and direction during the filling of the mold assembly.

Additional colors in the form of additional small streams comprising colored pigments can be added to the base polymerizing material, each small stream comprising different colored pigment added to a different high intensity high shear mixing zone comparable to Zone II such as illustrated schematically in FIG. 7 as Zones II*a*, *b*, *c* by dotted line routes having fed into each individual zone a different color *a*, *b*, *c*, etc. Of course, in such a modification of the apparatus and process separate streams would be diverted from a high intensity mixing Zone I into the multiplicity of Zones II*a*, *b*, and *c*, depending on the relative intensity of each color to be recombined in Zone III. Each color must be added through a separate second zone chamber having predetermined conditions of size, temperature, pressure and agitation and flow, such that when all streams are combined in Zone III the polymerization rates are substantially equally matched. The volume of the Zone II compartments must be carefully adjusted to maintain the desired results discussed for the single differently colored stream embodiment discussed above.

In most cases the lowest possible degree of mixing is employed in Zone III. The differently colored stream is folded into the base colored stream so that normally, considerably less than 5% blending takes place within the zone. In some cases a controlled slight degree of blending or diffusion of the colored stream into the background polymerization material enhances the three-dimensional vein pattern of appearance by causing variation in the contrast between the veins or colored stream than the other material. This contrast can be varied by changing the size of the differently colored stream as it is injected into Zone III. Of course the intensity of color of the differently colored stream can be controlled by the amount of coloring matter added at Zone II.

The desired differently colored stream or patterns are produced in material cast on a molding assembly on a one scale by introducing the differently colored polymerizing stream into the base colored polymerizing stream at Zone III with a material displacing member having a configuration that provides very low shear mixing action. The veins are formed by directing one or more controlled streams of the differently colored polymerizing streams in diameters ranging from 1/16 to 1/4 inch or by folding large wider bands ranging from 1 to 2 inches, into the base colored polymerizing material for controlled distances. The differently colored streams or veins are formed in the base colored polymerizing stream by means of a number of low shear mixing blade elements engaging the material in the third mixing zone and having material deflecting surfaces of predetermined size and configuration. Preferably, the mixing blade elements are mounted on a rotary member or stirring arm and range in width from 1/32 to 1/2 inch. The rotary member in Zone III used in the described embodiment of this invention is rotated at speeds between 50 and 200 feet per minute. The axis of rotation of the rotary member is preferably maintained at an oblique angle to the general direction of flow of the polymerizing material through the zone. In this arrangement, the mixing blade elements are adjusted such that the differently colored stream is folded into the base colored stream of polymerizable material in the low intensity mixing, Zone III, from the outer periphery of a mass towards its center by the mixing blade element. Usually the differently colored streams are folded or blended near the outer periphery of the path of the turning blade element in the low intensity mixing zone with the stirring arm turning at about 20 to 500 revolutions per minute while the polymerizing material is passing through the zone at a rate of about .1 to 2 cubic feet per minute. The amount of blending taking place may be regulated by the varying rotational speed of the blade elements or by varying the rate of flow of the polymerizing material through the low intensity mixing zone. Normally, for best results the throughput of the polymerizing material through Zone III is adjusted such that at speeds of 122 feet per minute of the blade element, the polymerizing material is extruded from Zone III through an orifice of 1/4 inch to 3/8 inch wide and thereafter is subjected to laminar or stream line flow conditions for a distance of 1/2 to 10 inches at velocities in the range of from 8 to 120 feet per minute prior to entering the mold assembly. This is necessary to maintain control over the colored vein configurations. The material is preferably laid directly onto the mold surface with little roll-over or scattering taking place in the mold assembly. The apparatus for producing the articles of the invention will be described in greater detail at a later point in this specification.

Figure 6:
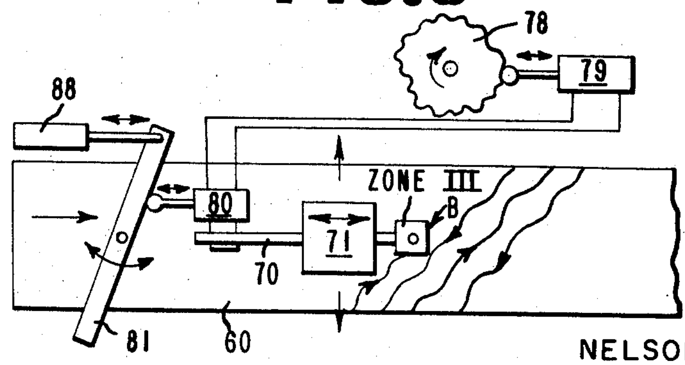
FIG. 6 is a partial schematic plan view showing one version of the controller for programming casting in the mold assembly.

For best results in filling mold assemblies, and in achieving reproducibility of patterns where the extruded stream from the third mixing zone is narrower than the mold assembly, a controllable preset programming means for controlling lay-down of the extruded stream in the mold assembly is required as shown schematically in FIG. 6. Where the width of the extruded stream with its particular pattern corresponds to the width of the mold assembly, a direct one pass lay-down of the extruded stream is the desired mold assembly filling technique. In the prior art where less control and a smaller degree of reproducibility was accepted, the lay-down of the extruded stream of polymerizing material was accomplished by manually programming the extruded stream of a given width onto a wider mold assembly. In so doing, the directional character of the individual separately identifiable streams of colored pigment within the mass obviously was varied by the person applying the resin to the mold assembly. In so doing, the pattern variation of the product cast on the mold assembly varied from one cast object to the next which was undesirable in mass production techniques where reproducibility and pattern matching are desired. In the development of such a pattern a person would incorporate swirls, waves, and zigzags to his personal liking. However, it has been found that even when following specific directions the pattern made by one person differs significantly from the next and created problems for manufacturing at one time acceptable patterns which can be blended or matched compatibly with other patterns produced at some other time by other people. This is particularly true in the manufacture of large cast sheets or objects, for example, in the range of 3 feet by 8 feet for use in wall panels, wherein matching of veins as to direction or configuration or other aspects is somewhat more important than normally encountered with smaller panels or objects made to resemble marble.

Another feature of the mold assembly filling operation is the arrangement required to achieve a clean, smooth, glossy finish on the major "use" surface of the cast article. Usually the extruded stream of polymerizing material is laid down in a mold assembly which, preferably, comprises a flat surface unit with sidewalls or raised side edges to contain the cast material, the major "use" side of the cast article being that surface which is laid down in contact with the bottom of the mold assembly unit. In order to achieve a clean, smooth, glossy finish on the surface of interest of the cast article, and prevent adherence to the mold assembly, it has been found highly desirable to place a thin disposable film F of an organic polymeric composition on the flat mold surface as shown in FIG. 1, such that the film is interposed between the mold surface and the material being cast or laid down thereon. As taught in prior filed U.S. application Ser. No. 834,985 filed July 23, 1969 in the name of Billingsley et al., and assigned to the assignee of the present invention it is also highly desirable to place between the mold surface and the film, a restraining fluid of controlled viscosity which holds the polymeric film against the smooth mold surface while permitting lateral movement of the polymeric film during the shrinking of the cast item. It is an important requirement that the shrinkage properties of this film be substantially matched to the shrinkage properties of the polymeric material placed thereon, especially on a moving mold assembly. Unless a lubricant-restraining fluid is added to the surface of the mold prior to the laydown of the thin polymeric film it is believed that the high degree of shrinkage of the polymerizing mass relative to the surface of a flat rigid mold assembly (usually metallic) causes wrinkling and undesirable surface irregularities on the final article. The type of lubricant selected is one which will not attack the film or the mold surface. Usually lubricating petroleum oils such as S.A.E.–10 are suitable for such films as polyethylene, polyvinyl alcohol, cellophane, polyethylene terephthalate, polyvinyl acetate resins and others. It is preferred that the films be biaxially shrinkable under the action of heat or certain solvents and be of uniform thickness in the range of .5 to about 30 mils. As an example of the shrinkage encountered, a 20%–30% volume reduction occurs during polymerization of methylmethacrylate polymers. This decreases with the amount of filler present, of course, and a typical example, a 60% filled poly(methylmethacrylate) system shrinks about .5 to 3 linear percent. The preferred film composition is one in which shrinkage nearly matches that of the polymer system.

In some instances it is also desirable to add a cover sheet of disposable polymeric film to the top of the polymerizing mass to prevent volatilization during curing processes. Such an arrangement of disposable film $F_t$ indicated in FIG. 1 is shown being added continuously to the top of a continuous belt operation whereby the polymeric composition is laid down on a film F and covered with film $F_t$. The top covering film should have properties similar to the bottom film, but, however, since the surface that it is in contact with is not necessarily the primary "use" surface its shrinkage characteristics need not be as critical.

Another important feature in manufacturing on a continuous large scale is the prevention of loss to the atmosphere of chemicals and reagents involved in the polymerization. In organic polymerizing systems loss of volatile components such as monomer not only interfere with the composition of the final cured mass but also present a hazard to the personnel in the form of poisonous fumes, fire and/or explosion hazards. The use of an entirely enclosed mold such as demonstrated in the above paragraph whereby a top covering film is added to the molded resin or a two-piece mold assembly can reduce these deficiencies.

Figure 2:
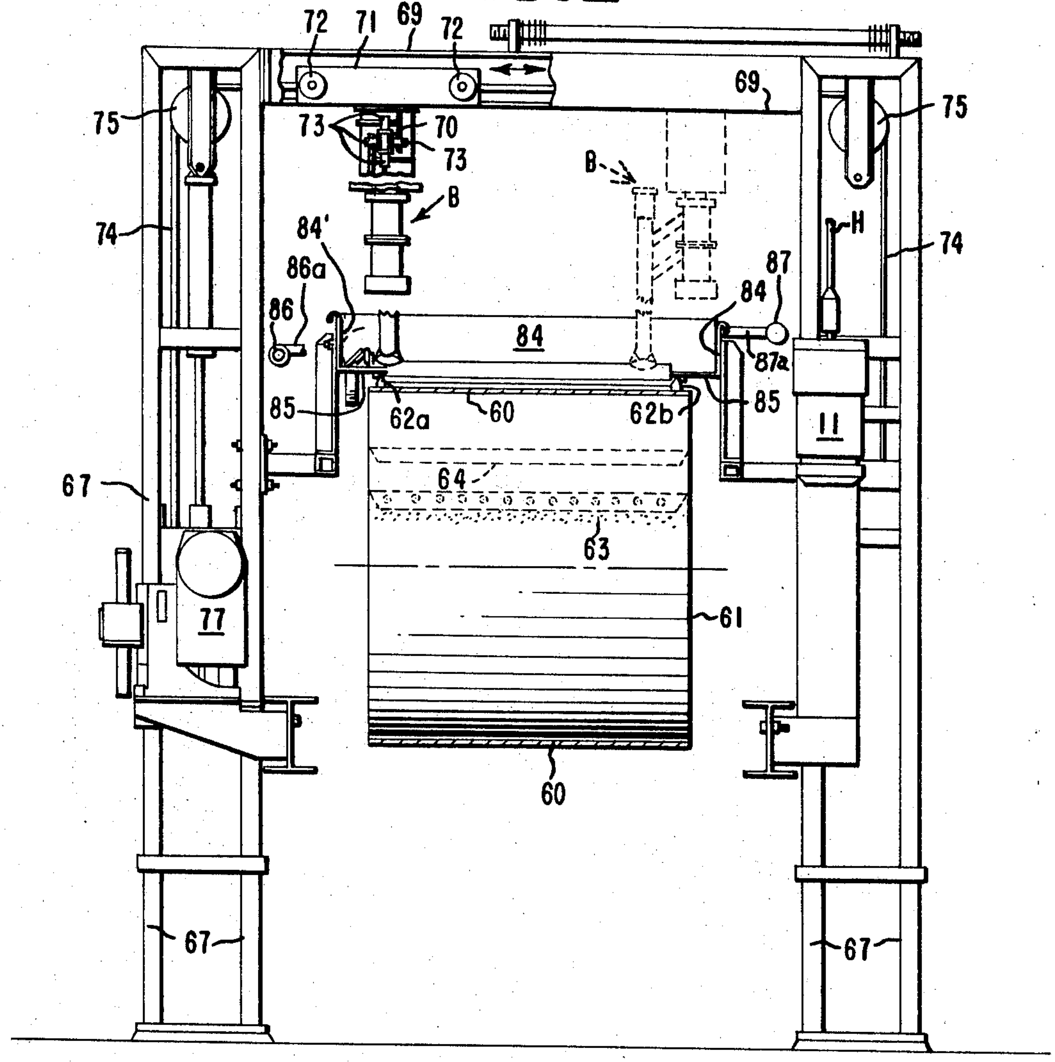
FIG. 2 is a partial transverse cross sectional view of the apparatus of FIG. 1 taken at line 2—2 of FIG. 3 with certain parts shown broken away.

In the continuous operation, however, where polymeric compositions are added to the partially exposed mold assembly for long periods of time, there is bound to be contamination of the atmosphere by reactants in the system unless precautions are undertaken in addition to those already discussed. One solution is to provide blanket means to cover the exposed portion of the mold assembly with an inert gas which is lighter than the vapors and/or noxious gases emanating from the polymerizing mass, but heavier than the surrounding air. One example of such a protective layer is carbon dioxide over a polymerizing mass of poly(methylmethacrylate). Usually the contaminant in such a system is the highly volatile methylmethacrylate monomer which evaporates to the atmosphere and causes surface cooling as well as precipitation of polymer on the top surface of the cast item. This is known to the art as "skinning" and is highly undesirable. The use of the carbon dioxide blanket prevents skinning by holding a monomer vapor concentration at the point of saturation immediately above the cast surface. Of course, to practice blanketing on a continuous process, an apparatus or specialized assembly is required wherein an equilibrium depth of blanketing gas or vapor is used to maintain the vapor equilibrium desired. Such an apparatus is shown in FIGS. 1, 2 and 3 as it applies to a continuously moving casting surface. This apparatus and its operation will be described later in further detail. Such an apparatus is equipped such that the blanket continually moves from one side at a point close to the bottom of the assembly to the top on an opposing side where it is removed. By passing the blanketing gas over the surface at a rate such that unnecessary turbulence is prevented, the amount of vapor, usually monomer vapor, which escapes to the atmosphere is held to a minimum. Any that is mixed with the heavier gas through normal physical mixing of the vapor with the gas is removed and is disposed of by suitably safe and noncontaminating techniques. Such gases as nitrogen, carbon dioxide, argon, and "Freon"® can be used and passed through absorbing towers to remove organic monomers characteristic of the reaction polymer system, and thereafter recycled for reuse as blanketing material. In a preferred operation the extruded veined material emanates from the Zone III orifice at a position within the protective gas layer. Obviously, the advantage offered by such a system is that the extruded material can be added to the flat mold assembly in an unrestricted manner. Either an individual or a movement programming or controlling device can direct the orifice over the mold surface in a desired two dimensional laydown pattern. Furthermore, an operator can work with full visibility of the casting operation directly above the open mold assembly for long continuous time periods without being affected physiologically by noxious monomer vapor.

With respect to the materials used in the practice of this invention, it is required that the polymerizing media into which the veining pigments are co-mingled be cured to a degree of about 75% within a time period no greater than about 10 to 15 minutes for continuous operations.

It is believed that the process and apparatus described herein can be applied to any inorganic or organic polymerizing systems which gel within the above time limits. Many fast gelling systems can be used such as acrylics, methacrylics, polyesters, polyamides, polyformaldehydes, etc., which can be formed in a manner such that gas evolution and shrinkage do not destroy the vein structure and appearance. It is also believed that the system could be employed in certain fast setting inorganic plasters and cements.

The particular preferred system employed in the process and apparatus of this invention utilizes poly(methylmethacrylate) filled with calcium carbonate, or alumina and marbleized with a great variety of veining pigments and colors.

The starting sirup for polymer-in-monomer solution may be prepared by any of the methods described in British Pat. No. 870,191 or U.S. Pat. No. 3,154,600. Specifically, the sirup may be made by heating a small amount of a polymeriztaion initiator in solution in the methacrylic ester and in the presence of a chain transfer agent at a suitable pressure and temperature. Heating is continued until the solution reaches a predetermined viscosity. Thereafter the hot solution is quenched by the addition of cold monomer containing a polymerization inhibitor. More specifically, a sirup having a viscosity of 0.5–50 poises at 25° C. can be produced from methylmethacrylate by heating the monomeric methylmethacrylate in a jacketed kettle at a temperature of 50–150° C. under refluxing conditions. These conditions normally produce an atactic polymer. Atmospheric pressure is used and the refluxing material is stirred. Heating is conducted in the presence of a very small amount of initiator and from the 0.05–1.0 mole percent of a chain transfer agent, such as the alkyl mercaptans and the mercaptans described in U.S. Pat. No. 3,154,600. When a bulk viscosity in the range of 0.5–50 poises, which corresponds to an inherent viscosity of 0.25–1.0 is attained, and the initiator content has been reduced substantially to 0, that is, below 20 parts per million, the polymerization is stopped by cooling in any suitable manner. In the present invention it is preferred that the final solution contain 10–35% by weight and preferably 25–35% of the methylmethacrylate polymer dissolved in the methylmethacrylate monomer. The polymer has an inherent viscosity of from 0.25 to 1.0 determined at 20° C. using a solution of 0.5 gram of the polymer per 100 milliliters of chloroform in accordance with the method described in F. W. Billmeyer, Textbook of Polymer Chemistry, Interscience Publishing, Inc. (1957) page 128.

Highly filled polymeric marbleized articles produced according to the invention comprise predominantly an inexpensive inert inorganic filler (usually in the range of 30–65% and as high as 80% in some cases) held together with a translucent polymeric material. Compatibility of fillers with polymeric material will vary from one polymer system to another; therefore, the words "inert" or "compatible" must be linked to the polymer system employed. Materials which are generally used as fillers are, for example, $TiO_2$, alumina, titanates, barium sulfate, calcium carbonate, white leads, lithopone, China clays, magnesite, mica, iron oxides, Spanish, Persian, American siennas, etc. Fillers range from very dark, in the case of iron oxides, to the very white, in the case of $TiO_2$. The color of the major stream may be referred to as the base color in a marble. That is, it is the background through which the veins run. Dyes and colored pigments can be homogeneously mixed with the light fillers to produce the desired color.

For special effects, fillers can comprise glass frits, beads, powders, fibers and/or metallic, organic or inorganic fibers of varying size, shape or color and combinations of these.

In the preferred polymer system disclosed, the filler is added either before the gelation or polymerization starts. Usually, a dispersing agent is also introduced to insure a homogeneous mixture. Methods for dispersing fillers are well known in the art. One procedure for filling methylmethacrylate systems is as follows:

A methylmethacrylate polymer-in-monomer sirup produced under the processes described above containing 25% polymer and having a viscosity in the range of 20–24 poises is mixed using a blade mixer with anhydrous calcium carbonate of particle size in the range of 6–10 microns being commercially available under the name of "Non Fer Al," a precipitated particulate calcium carbonate having low iron content is added in quantities to the sirup ranging between 40 and 65%. To the sirup-filler mix is added a dispersing agent to the extent of 0.1% to 1% by weight of the filler present. For example, zinc stearate is added in quantities comprising from .01–0.1% of the calcium carbonate. Polymer monomer sirup containing 30–70% calcium carbonate filler ranges in viscosity from 30–60 poises.

Although the above example indicates that only mild mixing conditions are required in the presence of a surface active agent to disperse the filler, it should be understood that any type of mixing suitable to disperse the filler evenly in the monomer polymer solutions can be employed. It has been found, however, that the majority of the above-mentioned fillers, including such fillers as glass, silica, and metal particles, having diameters less than 10 microns, can be suitably dispersed by the above-described manner.

According to preferred practice of the invention the above-described filled sirup can be used most satisfactorily when the teachings of U.S. 3,405,088 and 3,362,942 are followed in conjunction with the water-promoted cure teaching of the R. B. Duggins application Ser. No. 838,688 filed July 2, 1969, and assigned to the assignee of the present invention discussed in a following section of this specification. A satisfactory catalyst to effect a suitable cure with the materials of this invention is the presence of 0.05–5 mole percent of a metal salt of a hemiperester of maleic acid having the following formula:

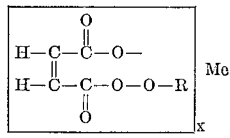

wherein Me is a metal, preferably selected from the group consisting of Group I–A metals (Handbook of Chemistry and Physics, 42 edition, Chemical Rubber Publishing Co., Ohio, 1960–1961, pages 448–449) (sodium, potassium, lithium, etc.) Group II–A metals (loc. cit.) (calcium, magnesium, strontium, barium, etc.), zinc, lead, cobalt, nickel, manganese, and copper;

$x$ is an integer that has a value of 1 or more up to and including the valence of the metal; and R is a saturated tertiary alkyl radical, preferably tertiary butyl.

In a preferred process for making marbelized filled polymer employing a continuous process in apparatus to be described in more detail later, it is important to have a polymer system which undergoes a very uniform and very rapid cure within a period of 5 to 15 minutes under conditions which are uniformly reproducible from day to day. When the resin is poly(methylmethacrylate) and prepared as described above a very uniform and rapid cure is achieved by the employment of controlled quantities of particular solvents described in detail in prior filed U.S. application S.N. 838,688 filed July 2, 1969 to R. B. Duggins, and assigned to the assignee of the present invention produces increased high rates of polymerization which are obtainable on a reproducible basis. In a typical formulation 32.8 parts of polymer-in-monomer sirup is mixed with distilled water until a total content of 700 parts per million of water is obtained. The water functions as a mutual solvent for water soluble catalysts as described by Duggins. With this is blended 61.8 parts of dry calcium carbonate or alumina in a high shear mixing device at a temperature not exceeding 85° F. This mixture is blended under high intensity mixing conditions with known quantities of thickeners, promoters, chain transfer agents, and catalysts in concentrations consistent with the teachings of the previously cited patents and treated in accordance with the teachings of this invention to form, under high intensity high shear mixing the initial polymerizing mass of basic color from which mass the two streams previously dsicussed are formed.

With respect to the preparation of the colored stream or veining pastes, the veins in marble may have a wide range of color. The coloring matter selected for these veins is commercially available from a wide variety of sources and is obtained under a number of tradenames. Coloring matter that is insoluble or only slightly soluble in monomer or mixtures of monomers is incorporated in the polymerizable mixture to impart veins. The term "pigment" as applied to such coloring matter is here used in the broad sense of a powdered or powderable material which can be mixed with liquid to impart color thereto, including black and white. The term "dye" thus includes lakes, toners, and organic and inorganic pigments. The term "pigment" includes those that are opaque, translucent, and transparent. Transparent pigments are those which impart color without opacifying and without being dissolved. Inorganic pigments may be natural or synthetic. They are usually metallic compounds. Typical of these are barium sulfate, titania zinc oxide, zinc sulfate, zirconium oxide, various lead compounds, lithopone, etc. Also included are black iron oxides; hydrated yellow oxide, venetian reds; cadmium yellows, oranges, reds, and maroons, including cadmium sulfoselenide, cadmium yellows prepared with zinc sulfide or barium sulfate, cadmium lithopones, or cadmium sulfoselenides; umbers; metallic browns, such as calcium limonite or siderite; brown iron oxides; ochre; synthetic yellow or orange iron oxides; chrome yellows; antimony yellow; chrome greens; iron blues; cobalt violets; carbon blacks, including channel and furnace blacks; luminous and phosphorescent pigments, including special grades of zinc sulfide and activating agents; leafy pigments giving pearlescent effects, such as pearl pigments; lead iodide; mercurious chloride; bismuth oxide; metal bronzing powders; aluminum powders; aluminum bronze; copper aluminum bronze powders; gold leaf; silver; copper; and nickel.

Organic pigments are included in a large number of classes. The organic coloring matter differ considerably in light fastness and are selected not only for the color or shade desired but for conditions which are encountered in the use of the pigmented plastics and in the polymerization of the mixture. Thus, organic pigments are selected not only for shade but also resistance to the possible action of the initiator system. Conversely, the initiator system may be adapted to the pigment. In the case of organic colors which tend to be soluble in the monomer system, the color may be used in a lake.

The colored pigment or pigments to be added as veining materials should be dispersed in monomer or sirup described previously to form a fluid feed stock. Some pigments can be worked, or milled, into monomer polymer or mixtures of monomer and polymer without added dispersing agents. In other cases it may be desirable to utilize a dispersing agent to overcome agglomeration of pigment. Typical dispersing agents include lignin sulfonates, polymers of maleic anhydride, dodecyl sodium sulfate, etc.

Pigment may be mechanically mixed with monomer or monomers or with a monomer-polymer mixture or with simply a polymer. The resulting mixture is then taken up in the rest of the monomer or monomer-polymer mixture. Milling of pigment may be done with a wide variety of polymeric materials which may be the same as, or different from, that to be used in the monomer-polymer system. Any soluble acrylic polymer may be used in this way. Likewise, pigment may be milled with a soluble styrene polymer or copolymer. Vinyl chloride and/or acetate polymers may also be used and may be especially useful for dispersing carbon blacks. Cellulose acetate or cellulose acetate butyrate are also good media. Nitrocellulose is commonly used with carbon black and with dispersions of phthalocyanine colors.

It may be desirable to grind or mill the pigments and colors in a plasticizer as well. A mixed plasticizing system of liquid monomer and polymer is quite effective in dispersing the various pigments and the resulting paste is readily co-mingled with a filled monomer-polymer system. A number of typical feed stock mixtures of pigment in polymethyl methacrylate polymer-in-monomer sirup are shown in Table 1.

Filled polymerizing organic polymer sirups containing initiators, catalysts, modifiers and base colored fillers, such as calcium carbonate, iron blacks, etc., are made into articles having an appearance and structure pleasingly similar to marble by adding limited quantities of one or more contrasting colored pigments dispersed in the polymerizing base system. The description and disclosure of the invention deal primarily with poly(methylmethacrylate) sirups, but are considered to have application to other polymer systems. The differently colored polymerizing streams which are used to simulate veins must be carried into the base colored polymerizing stream by means of mixing devices operating under conditions which produce a desired low degree of shear, with an extremely low degree of mixing in the polymerizing bulk. Pleasingly varied veins can be produced by conducting the combined streams through an orifice under streamlined flow conditions prior to filling the mold.

The preferred apparatus embodying principles of this invention are shown in the FIGS. 1 through 5. In these figures are shown a manufacturing arrangement embodying a polished stainless steel endless conveyor 60 having the dimensions of 3 feet in width and a smooth flat casting surface of approximately 100 feet in length. In cooperative arrangement with this belt is shown a three-zoned blending mixing and casting head device B haaving a first and second zone wherein high intensity, high shear mixing of polymerizing ingredients takes place and a third zone wherein low intensity, low shear blending takes place wherein the colored veins are added to the base polymerizing stream to form the patterned vein structure which is extruded and cast onto the moving belt surface in a direction predetermined by mechanical and programming means. Cooperating with this moving conveyor belt in the vicinity of the filling location are means for feeding a continuous film F onto the surface of the belt as well as means for covering the freshly cast material with a cover film FT. In addition, an apparatus arrangement for blanketing the casting area with an inert gas is shown in FIGS. 1–3.

FIG. 4 shows in detail the before-mentioned three-zoned mixing and casting head device B having a movable support element 1 with a vertical extending passageway 2 extending through it. The pasageway 2 cooperates with portion 4 of casing element 5 to rotatably support the main apparatus elements of the invention. As shown, elements 5, 6, and 7 form a composite housing assembly for high intensity mixing Zones I and II in which the polymerizable ingredients or materials are brought together and intimately mixed with high shear mixing action. A lower transverse plate element 17 comprising a gasketed flanged assembly, together with an interior cavity in element 7, form the chamber 19, for receiving and thoroughly, intimately mixing with a high intensity, high shear mixing action the catalyzed filled polymer resin containing the base coloring and filling ingredient which is supplied from a storage tank (not shown) through metering devices (not shown) through flexible conduits 30 and **30*a* into a base transverse element 8. An upper transverse plate element 15 comprising a gasketed flanged assembly, together with an interior cavity in element 6 form a second mixing zone, or chamber 13, in the composite housing assembly for receiving and thoroughly intimately mixing with a high intensity, high shear mixing action in the confined second zone having predetermined dimensions under controlled predetermined conditions, a predetermined portion of the mixed ingredients passing from the first mixing zone and a predetermined quantity of coloring material entering from conduit 14 having a color different from that of the mixed ingredients of the first mixing zone. A vertically extending, rotatably mounted shaft 9 extends through elements 5, 6, and 7 of the composite housing assembly and is drivingly connected at its upper end by means of a sleeve coupling element 10 to a flexible rotary output shaft H of a variable speed electric motor 11 which is secured in operative position to the conveyor belt frame assembly. The lower end of shaft 9 extends through the lower chamber 19, but is unsupported at the lower end. Orifice 17*a* formed in transverse element 17 controls movement of a predetermined portion of the mixed ingredients from the first zone to the second zone. By regulating the dimensions of the orifice 17*a* in a predetermined manner the desired portion of the mixed ingredients of the first zone is permitted to move into the second mixing zone. Rectangular blades 29 and 28 with square cross sections for high shear mixing are secured to the shaft 9 for rotary movement therewith in the upper chamber 13 and lower chamber 19. Stability of rotation of shaft 9 is enforced through stabilizing collar 23 and bearings 22 at the uppermost end of the shaft. Transverse element 15 cooperates with a stationary plastic lubricating and sealing collar 16 which is provided with passages to allow for flow of suitable lubrication fluids through interconnection with a conduit 18 and slot conduit 20 in the collar 16, which is held in cooperative arrangement by set screws S protruding through element 5**.

The previously described component of the mixing and casting assembly B comprising Zones I and II is rigidly interconnected with the component of the mixing and casting assembly B labeled Zone III in FIG. 4 through conduit elements 31 and 34 and are joined at a longitudinal junction plate assembly comprising flanges 35 and 36. Cylindrical casing element 42 cooperates to form with transverse elements 41 and 44 on the upper end and with 43 and 45 and 46 on the lower end, a third low intensity, low shear mixing zone having predetermined dimensions. Conduit 31 is of predetermined dimensions operatively connected with the second and third mixing zones such that at a predetermined flow rate, and under predetermined conditions, the stream of the intimately mixed differently colored material can pass from the second to the third mixing zone. Conduit 34 is operatively connected with the first mixing zone and the third mixing zone and of predetermined dimensions for conducting, at a predetermined flow rate and under predetermined conditions, a stream of the intimately mixed ingredients from the first mixing zone to the third mixing zone. A vertically extending, rotatably mounted shaft 47 extends through elements 41, 44, 42, 43 of the composite housing assembly of Zone III and is drivingly connected at its upper end by means for a sleeve element 49 to a rotary output shaft 50 of a variable speed pneumatic motor 52 having an air inlet conduit 53. The motor assembly is further rigidly mounted to element 41 via coupling 51. Since the lower end of the shaft which passes through cavity 40 is not rigidly fixed to a bearing, it is stabilized by a "Teflon" ® plastic sleeve supporting and seal element 44 which is positionally stabilized with set screws (not shown) which protrude through element 42 and lubricated by means similar to element 16. Longitudinal blade mixing elements 48 are secured to the shaft 47 for rotary movement within the lower chamber 40 and act as a movable material displacing member having a predetermined size, dimension, and configuration constructed and arranged to provide predetermined, reproducible, repetitive movement at predetermined rates to produce a limited low intensity, low order, low shear mixing action on the combined streams of intimately mixed ingredients conducted from the first and second mixing zones and to displace the streams of differently colored ingredients from the second mixing zones through the other streams. The shaft 47 is rotated under predetermined controlled speed such that the differently colored stream 32 passes into the base colored stream 33 without intimate mixing, in at least one predetermined, continuous, reproducible, separately identifiable, three-dimensional configuration. Orifice member 46, shown in greater detail in FIG. 5 by means of an end view at line 5—5 of FIG. 4, provides a restricted orifice of predetermined shape and dimension and acts in communication with the third mixing zone to form a sheet comprised of the combined streams of polymerizing material. The shape of the orifice nozzle 46 is easily removed and changed to other suitable assemblies and shapes by means of a threaded coupling 45 and represents only one preferred form of the orifice.

It should be understood, however, that to operate the described apparatus means must be employed to provide a driving force or pressure on the fluids moving through the apparatus. The preferred method is to pump the liquid starting materials from their storage reservoirs using standard rotary or positive displacement pumps to provide the needed pressures in the first, second and third zones, and the conduits 32 and 33. The pressures in the high intensity mixing zone can be further regulated by the incorporation of an orifice plate in either or both of the conduits 32 and 33 with orifices 39 and 38 to control the relative flow rates of the streams conducted therethrough. Furthermore, to provide additional control over the action taking place within the first and second mixing zone, and related conduits, such that the materials of the streams passing into Zone III are substantially equally matched as to density, degree of polymerization, and viscosity it may be desirable to have heat transfer means cooperating with at least one of the high intensity mixing zones. Such a heat transfer means is provided by jacket 24 providing a cavity 25 such that cooling or heating fluids may be passed into the zone by inlet 26 and removed through outlet 27.

The mixing and casting head assembly, comprising Zones I, II and III, is particularly useful when applied on a continuous basis to lay down veined material in the manufacture of large sheets or slab-like objects of a mableized product suitable for use in the building industry. Such sheets normally are cut to lengths varying from 4 to 12 feet, having widths ranging from 2 to 4 feet. Preferred apparatus for casting such a marbleized product is shown in FIGS. 1, 2 and 3.

TABLE I

| Mixture | Color designation | Parts by weight | | |
|---|---|---|---|---|
| A | Brown | 10 | Parts raw umber | 90 |
| B | Malaco black | 4.75 | Iron black | 95 |
| | | .5 | Raw umber | |
| C | Olive green | 25 | Light chrome Green | 500 |
| | | 2 | Dark chrome green | |
| | | 2 | Lamp black | |
| D | Shell pink | 9 | $TiO_2$ [1] | 500 |
| | | 9 | Venetian red | |
| | | .08 | Bulletin red | |
| E | Talisman brown. | 0.5 | Lamp black | 500 |
| | | 2.5 | Raw umber | |
| F | Florentine grey | 3 | $TiO_2$ [2] | 500 |
| | | 2 | Iron black | |
| | | 0.5 | Yellow ocher | |
| G | Persian gold | 10 | $TiO_2$ | 500 |
| | | 4 | Raw sienna | |
| | | 1 | Burnt umber | |
| | | .25 | Raw umber | |
| | | .25 | Venetian red | |
| H | Chinese red | 50 | Bulletin red | 200 |
| | | 0.5 | Prussian blue | |

[1] Dispersed in 3 parts sirup.
[2] 1 part/3 parts sirup.

In FIGS. 1, 2 and 3 is shown an endless stainless steel belt 60 having dimensions 3 feet in width by about 200 feet in length with a thickness approximately 3/32 of an inch. This belt is stretched at high tension between two drums (one shown) 61 mounted on trunnions (not shown). At each edge of the flat belt is mounted endless siderails **62*a* and 62*b* which act to form the sides of an endles mold cavity having a total flat, horizontal, usable surface measuring about 100 feet in length by 36 inches in width. Additional supporting rollers are provided between the rotating drums 61 at strategic locations. For best results, the top surface of the belt upon which the resin is cast is maintained completely flat and level. The belt is driven by an electric motor geared to one of the major drums 61 (one not shown) at speeds ranging from ½ to 9 feet per minute. The casting surface is also further provided with cooperating insulating and heating facilities (not shown) to maintain a fast cure rate and, finally, a cooling faciltiy (not shown) to remove heat from the cast sheet such that safe manual handling can be accomplished. In accordance with the teachings of prior-filed U.S. patent application Ser. No. 843,985 filed July 23, 1969 in the names of Billingsley et al. and assigned to the assignee of the present invention, the highly polished surface of the stainless belt is lightly coated with a restraining liquid through a distributor manifold 63 and a squeegee-type spreader 64 to regulate the amount of liquid added to the surface. A releasing film F of polyvinyl alcohol resin having a thickness of 1½ to ½ mils is fed continuously from a roll 65 and placed against the smooth casting surface. The film release sheet F is pressed into intimate contact with the stainless belt by roller 66 pressing against the belt pulley 61. A frame structure comprising upright sections 67 and 68 is located adjacent each side of the belt and is interconnected directly above the belt by transverse sections 69. The upright and transverse sections are constructed as shown in FIGS. 1, 2 and 3 from angles, channels and I-beams of suitable thickness and strength to support the mixing and casting assembly B of FIGS. 4 and 5, as well as mechanical controlled drive mechanisms for said apparatus. The mixing and casting assembly B is carried by a traveling beam 70 which moves in a plane parallel to that of the casting belt. The beam 70 rests on roller bearings 73 which permit longitudinal sliding arrangement of the beam in a direction parallel to the movement of the belt. These bearings are supported in a transversely movable carriage 71 mounted on four wheels 72 which ride in opposed transverse channeled portions of the transverse sections on members 69 parallel with the belt surface in a direction at 90° to the direction of travel for the belt. The carriage 70 is moved transversely to the direction of the belt by means of cables 74 attached thereto and cooperating with guide pulleys 75 mounted in the frame structure as shown. At one side of the belt the cable is moved in one direction by a suitable power drive arrangement 76 and is moved in the other direction by a similar power drive arrangement 76*a*. The alternating back and forth motion is controlled by a hydraulic trip valve switching arrangement which is actuated at the end of carriage movement in one direction to activate the other drive arrangement. This same hydraulic trip valve arrangement also acts at the same time to activate a reciprocating hydraulic piston unit 88, which adjusts the angle of the pivotally mounted guide rail beam 81 which is pivotally mounted at 81P. Guide rail beam 81 is provided with linear cam rails 100 which cooperate with cam rollers 101 carried by beam 70 to control its longitudinal position relative to the carriage 71. The cooperation of rollers 101 with rails 100 during transverse movement of carriage 71 carrying the beam 70 controls the angle of travel of the mixing and casting head B across the casting surface of the moving belt 60. In order to maintain the same resultant angle or basic track of material cast across the moving belt during movement of the mixing and casting head B across the belt, the guide rail beam is adjusted by piston unit between two predetermined positions, one for each direction of movement of the head B across the belt. This adjustment is synchronized with the back and forth movement of head B and carriage 71 by means of the trip valve arrangement described previously. A hydraulic master piston motor 79 actuates slave piston motor 80 which is connected as shown in FIG. 1 to a bracket 104 secured to beam 70 and which carries cam rollers 101 which travel along the guide rails 100 on the guide rail beam 81. Motor 79 comprises a piston 79*a* which responds to movement caused by its engagement with the surface of cam 78 which rotates at speeds pre-controlled by adjusting its cooperating variable speed drive motor 77. By adjusting the speed of motor 77, the shape of cam 78 in this arrangement, a predetermined irregular movement can be superimposed on the basic diagonal movement of head B back and forth across the belt. The shape of cam 78, the speed of motor 77, the rate of transverse of carriage 71 can be coordinated in a predetermined controlled manner to provide a programming means cooperating with the mold assembly speed to control the path of the orifice 46 of head B as it moves the extruded stream across the molding assembly in a predetermined, reproducible pattern under controlled, non-turbulent flow conditions. The rate of polymer addition to the belt is integrated with the speed of the forward motion of the belt surface and the polymer storage pumping devices. As the resin is placed onto the casting surface it moves forward and passes under a gauging plate 82 which can be adjusted at the thickness desired when the resin is squeezed between the film covered belt supported by roller 83 and the covering film $F_t$ passing between the gauge plate and the top surface of the polymerizing resin. Independently supported on the upright portions of the frame structure is a means for gas blanketing the molding assembly and the stream of castable polymerizing material moving from orifice 46 to the mold assembly. and which is arranged to maintain a continuous moving protective blanket of an inert gas between the surface of the polymerizing material on the surface of the mold assembly and the surrounding atmosphere for a predetermined time period or until the castable material is covered by the covering film $F_t$. The gas blanketing means comprises a box arrangement having vertical sides 84 and horizontal bottom elements 85 which slidingly engage the side rails 62 to form a seal, the remaining side of the box arrangement is formed by the moving film $F_t$. One side of the box is provided with a gas inlet manifold 86 which fills the box through a series of branch connections 86***a* with a heavy inert gas to a point above the nozzle tip at Zone III of the veining head. Gas, as it passes from one side of the belt to the other, is withdrawn by a series of outlets 87*a* which are connected to the outlet manifold 87 at the opposing side of the casting assembly. The gas is then discharged to disposal devices (not shown).

In a preferred apparatus arrangement embodying principles of the invention and suitable for producing rectangular thin (1/16 inch, 2 inches thick) cast articles in large sheets, the following specific information is given:

Conduits 14 and 30, 30*a* which supply materials to chambers 13 and 19 from storage tanks are 3/4-inch flexible and 1/4-inch flexible tubing connecting with pumping devices used to meter accurate quantities of materials to the moving blending head device. With 60% calcium carbonate filled poly(methylmethacrylate) resin containing pre-controlled amounts of catalyst chain transfer agent and, in some cases, release agents, a positive displacement gear pump is used to transfer 16.7 lbs. per minute of material having a specific gravity of 1.6 into the lower chamber 19 through line 30. An accelerator is added at 30*a*. The lower chamber is about 2–3 inches in diameter and about 4 inches in height. The polymerizing ingredient passing through chamber 19 is mixed by the high intensity blades 29 rotating at speeds approximately 600 to 3000 r.p.m. Each blade section is made in a square high shear configuration having 3/16 inch on a side. This thixotropic mixture is then forced out of chamber 19 by the pump into the 3/4-inch pipe conduit 34 and also into the chamber 13 through the 3/16-inch opening 17*a* surrounding the shaft 9 in transverse section 17. The ratio of material passing into the 3/4-inch pipe conduit 34 through longitudinal section 37 to that material which passes into chamber 13 and out through conduit 32 into the 1/2-inch transverse opening 39 and into chamber 40 is regulated by the adjustment of the conduit elements 31 and 33 size ratio, as well as the size ratio of orifices 39 and 38. At the above rate this amounts to about 20% through orifice 39 and about 80% through a 3/8-inch orifice at 38. The coloring matter entering through flexible line conduit 14 and the entering base mix in chamber 13, which measures 1–2 inches in diameter and 2–3 inches in length, is further subjected to high intensity, high shear agitation to form a uniformly colored effluent and is preferably cooled to remove some of the heat of exotherm. At this point the reaction rate can go beyond that passing into conduit opening 34 due to the additional mixing. Water at 17 to 20° C. is passed into the cooling chamber 25 at inlet 26 and exits at 27. The cooling media also acts to prevent overheating at the bearing surfaces at the collar 16 which can be lubricated by forcing oil in conduit 18 through the sleeve opening 20 and around the circumferential chamber of sleeve 16. The lubricant also serves as a sealing means around the rotating shaft which is inspected through sight port opening 21 where excess lubricant can be discharged. It is important that no air be sucked into the turbulent mixing assembly, since air pockets formed in the fast polymerizing resin show up in the cast article as bubbles. A colored pigment stream is pumped in through a metering device at inlet 14 into chamber 23 at a rate of approximately 9 grams per minute of slurry containing 25% pigment. The coloring pigments are blended at the rotation of high shear mixing blades 28 which are constructed of square steel keystock as described for blades 29. The colored stream is then co-mixed with the base stream in desired volume proportions in chamber 40 which is approximately 1–2 inches in diameter by 3 inches deep. The shaft 47 is rotated by a pneumatic motor at a rate of about 200 r.p.m. and blends the coloring stream into the base color using rotating low shear blades 48 having a thickness of 1/16 inch and a width of about 1/4 inch. The veined material then passes out of an orifice having a width of about 1 1/2 inches and an opening of about 1/4 inch at 46 and passes onto the moving casting surface at a specific gravity of 1.6. When the belt surface moves at a rate of 3 feet per minute the laydown rate just stated is sufficient to form a sheet 3 feet wide at a thickness of approximately 1/4 inch. As the casting head traverses across the belt at an angle approximately 45° to the direction of travel the streamline flow from the nozzle lays down a resultant pattern formed by a relatively linear basic direction with an irregular transverse oscillating movement superimposed thereon by operation of the cam operating device at 78 and hydraulic cylinder 81. The carriage movement is regulated such that it traverses across the belt surface and back at about 20-second intervals.

In the operation of the mixing and casting assembly in head B defining Zones I, II and III, it is to be understood that the volume ratio of material passing from Zone II to the material passing from Zone I can be varied while maintaining the polymerization rates and degree of polymerization essentially constant and substantially equal at their point of entry into Zone III. Several things can be done to maintain this degree of constancy, especially with thixotropic fluids undergoing polymerization at a rapid rate, which are: to vary the heating and cooling rates of the material in Zones I and II, to vary the volumetric size ratios of Zones I and II and their outlet conduits 31 and 33, as well as the regulation of the relative sizes of the orifices 39 and 38. It is contemplated that the major portion of material entering Zone III could be the differently colored stream emanating from Zone II, which could be constructed to provide larger volume than Zone I. Therefore, the coloring of the veining pattern previously described would essentially be reversed in that the base colored stream would create the vein structure.

Especially under continuous operating conditions as described previously, the vein pattern structure and appearance at a given point is reproducible and will be substantially repeated by the apparatus over controllable periods of time to make possible closely matching patterns produced in large sheets of cast material. When the extruded stream is narrower than the mold assembly such as described in the apparatus in the FIGS. 4, 5 and 8, additional predetermined and reproducible variations in the vein pattern of the final article can be controlled by achieving the laydown pattern of the stream in the mold by the controllable movement programming arrangement. A schematic showing of such an arrangement is shown in FIG. 6, in which is indicated a mechanically controlled device described in more detail in FIGS. 1, 2 and 3. The type of laydown pattern which such a device yields is indicated in a plan view. The irregularity of the laydown path is dictated by the shape of cam 78 and the speed of motor 77 which drives it.

While the previous discussion, in detail, relates to a preferred form of apparatus described specifically in FIGS. 1 through 5, it is pointed out that alternate forms of apparatus within the scope of the invention, are suitable to carry out the process discussed. Various alternatives have been provided for that component of the mixing and casting head which establishes the low intensity, low shear blending Zone III. Such alternative apparatus designs are shown in FIGS. 8*a*, 8*b*, 8*c* and 8*d* and have certain advantages in handling higher rates of flow of material through the system. These figures show apparatus components which can be incorporated with the component defining high intensity Zones I and II of the previous figures and used in placed of the component defining Zone III indicated in FIGS. 4 and 5. FIG. 8*a* shows a low shear, low intensity mixing zone comprising a cylindrical chamber 140 having an overflow weir outlet 145 which empties into an elongated, rectangular shaped conduit 146. Rotating within the elongated cylindrical chamber 140 is a six-bladed 141 folding paddle rotated in the direction shown by the motor driven shaft 150. The blending device is adapted to fit the outlets of the high intensity mixing device indicated in FIG. 4 at conduit openings 38 and 39. Since the chamber 140 empties by a flow against gravity, it is provided with a drain plug 144, such that the rapidly polymerizing material can be quickly drained and cleaned to prevent a freeze-up of the rotating blade mechanisms on shutdown of the system. As the mixing device is rotated in the direction shown, the three low shear blades mounted at the left on angled members 142 and 143 force the polymerizing mixture towards the periphery of the cylindrical chamber while the three blades on the right force the resin toward the central portion of the cylinder. The members 142 and 143 are angled such that they act as propellers to drive the resin toward the uppermost portion of the chamber where it will pass through the outlet 145 and move under streamlined conditions through conduit 146 as it passes onto the mold assembly. Another modification of this device is shown in FIG. 8*b* wherein the six-blade propellered blending mechanism is replaced by a rotating auger or screw member 241 mounted on shaft 250. The pitch of each blade 248 on the auger is adjusted such that when rotated in the direction shown the colored material is folded and cut into the base colored mass and is moved towards the uppermost section of the chamber 240 where it passes through opening 245 and moves through rectangular shaped conduit 246. Upon the shutdown of the apparatus it also can be drained by removing plug 244. FIGS. 8*c* and 8*d* indicate another apparatus for low intensity, low shear mixing which employs the features of 8*a* and 8*b* in combination to a certain degree. The blending chamber 340 is composed of an elongated narrow, vertical cylinder which is centrally positioned above a wider cylindrical area. Onto the shaft 350 passing through the center of each cylindrical area is mounted an auger or screw device 341 having blades which are pitched in a direction to force the polymerizing mix into the lower portion of the chamber, wherein it is rotated by the six-bladed paddle device 341 mounted between propeller-like members 342 and 343. When rotated in the direction shown in FIG. 8*c*, the combined apparatus acts to force the polymerizing mixture from the uppermost end of the chamber towards the bottom end of the chamber with precontrolled speed and blending, and thereafter through an elongated flattened exit on extrusion passageway 346, as shown in detail in FIG. 8*d*. The passageway 346 is formed by spaced opposed parallel wall portions 348 and **348*a* cooperating with opposed wall plate elements 347 and 347*a*, the elements 347 and 347*a* held in position by suitable bolts 349**. While the above-described components of FIGS. 8*a*, *b*, and *c* have been provided as alternate designs useful in creating veined structures in a polymerizing mass, the intermediate products formed thereby having separately identifiable distinct veins, which are slightly different in aesthetic character from one another. The alternative designs do not necessarily produce exactly the same veined pattern in a polymerizing mass being cast.

It is believed to be clear from the foregoing description and discussion that a novel improved intermediate product and production arrangement therefor has been provided in accordance with the objects of the invention.

Although certain preferred embodiments of the invention have been described in detail in accordance with the Patent law, many modifications and variations within the spirit of the invention will occur to those skilled in the art and such are considered to fall within the scope of the following claims.

What is claimed is:

1. An improved high speed apparatus for continuously producing an extruded flowable, castable stream of colored rapidly polymerizing material in predetermined dimensions, said stream having distributed and suspended therein at least one relatively smaller elongated substantially continuous, coherent independent separately identifiable, compatible mass of differently colored rapidly polymerizing thixotropic material disposed in a predetermined repetitive reproducible irregular three dimensional pattern the differently colored polymerizing materials being substantially equally matched as to viscosity, density and degree of polymerization, said apparatus comprising in combination, a first means for receiving and bringing together and thoroughly intimately mixing with a high intensity high shear mixing action in a confined first mixing zone of predetermined dimensions under controlled predetermined conditions, predetermined quantities of a plurality of polymerizable ingredients, a second means for receiving and thoroughly intimately mixing with a high intensity high shear mixing action in a confined second mixing zone of predetermined dimensions under controlled predetermined conditions a predetermined portion of the mixed ingredients from the first mixing zone and a predetermined quantity of coloring material having a color different from that of the mixed ingredients of the first mixing zone, a third means of predetermined dimensions operatively associated with said first and second mixing zones to control movement of a predetermined portion of the mixed ingredients of the first zone to the second mixing zone, a fourth means defining a third low intensity, low shear mixing zone of predetermined dimension, a fifth means of predetermined dimensions operatively connected with said second means and said fourth means for conducting, at a predetermined flow rate and under predetermined conditions a stream of the intimately mixed ingredients of different color from said second mixing zone to said third mixing zone, a sixth means of predetermined dimensions operatively connected with said first means and said fourth means for conducting, at a predetermined flow rate and predetermined conditions a stream of the intimately mixed ingredients from said first mixing zone to said third mixing zone, a seventh means cooperating with said fourth means and comprising a movable material displacing member of predetermined size, dimensions, and configuration constructed and arranged for predetermined, reproducible, repetitive movement at predetermined rates in said third mixing zone to produce a limited low intensity low order, low shear, mixing action on the combined streams of intimately mixed ingredients conducted from the second and third mixing zones and to displace the stream of differently colored ingredients from the second mixing zone throughout the other stream, without intimate mixing, in at least one predetermined, continuous, reproducible, separately identifiable three dimensional configuration, and seventh means further comprising a driving means operatively connected with said material displacing member for moving said member in said third mixing zone, said fourth means further provided with structure defining a restricted orifice of predetermined shape and dimensions in communication with said third mixing zone to form a sheet comprised of the combined streams of polymerizing material, eighth means cooperating with said first, second, fourth, and fifth means for developing in said streams a predetermined level of pressure, said predetermined dimensions, conditions, and rates all controlled and predetermined such that a sheet formed by said restricted orifice comprises the polymerizing material with the discrete differently colored stream, distributed therethrough in at least one predetermined repetitive reproducible three dimensional irregular separately identifiable pattern and color relationship and such that such said streams are maintained in flowable condition at least until they pass said orifice, and such that the materials of the streams forming the extruded sheet are substantially equally matched as to density, degree of polymerization, and viscosity.

2. The improved apparatus of claim 1 which further comprises heat transfer means cooperating with at least one of the streams of polymerizing materials to assist in controlling the degree of polymerization thereof.

3. The improved apparatus of claim 1 in which said fifth and sixth means are provided with means for controlling the relative flow rates of the streams conducted thereby.

4. The improved apparatus of claim 1 which further comprises a movable high speed high shear material displacing and mixing members of predetermined size dimensions and configuration operatively mounted in each of said first and second mixing zones, and a high speed drive means operatively connected with said high shear material displacing and mixing members and constructed and arranged to drive said high shear members at predetermined velocity sufficient to achieve intimate rapid mixing and maintain the viscosity of rapidly polymerizing thixotropic materials treated thereby at a low level for high velocity flow through the apparatus.

5. The improved apparatus of claim 1 which is provided with a ninth means cooperating with said structure defining said orifice, a molding assembly and a stream of castable polymerizing material moving from said orifice to said molding assembly said ninth means constructed and arranged to maintain a continuous moving protective blanket of an inert gas between the surface of said stream and the surrounding atmosphere for a predetermined time after said stream leaves said orifice.

6. The improved apparatus of claim 5 in which said ninth means comprises a substantially horizontal open-topped enclosure assembly of predetermined dimensions cooperating with a mold assembly and said orifice, said enclosure assembly constructed and arranged to maintain a layer of a gas heavier than air in position surrounding a stream of castable polymerizing material moving from said orifice to mold assembly and overlying a portion of the material after it has been cast on the mold assembly, such material comprising a volatile monomer component and a polymer component in a liquid or semi-liquid condition, said enclosure assembly comprising inlet means for supplying to said enclosure assembly predetermined quantities of an inert gas heavier than air and outlet means for removing from the enclosure assembly the inert gas together with a certain amount of the volatilized monomer component, the rate of flow of said inert gas, the amount of volatilized monomer component removed, and the positions of the inlet and outlet means selected such that for the dimensions of said enclosure assembly and the amount of polymerizing material present therein, an intermediate layer of sufficient size and concentration of the volatilized monomer component is maintained between the inert gas layer and the surface of the cast material to establish a substantial equilibrium condition between the monomer in the intermediate layer and monomer in the cast material in order to significantly limit additional escape of the volatile monomer component from the cast material and also limit formation of a polymer skin layer thereon.

7. The improved apparatus of claim 1 which further comprises a programming means cooperating with a molding assembly and said structure defining said orifice for directing the extruded stream to the molding assembly in a predetermined reproducible pattern and under controlled non-turbulent flow conditions.

8. The improved apparatus of claim 7 in which said programming means comprising an actuating means operatively connected to move said orifice relative to a mold assembly in accordance with predetermined control signals.

References Cited

UNITED STATES PATENTS

| | | | |
|---|---|---|---|
| 2,816,741 | 12/1957 | Shuffman | 18—4X |
| 3,040,381 | 6/1962 | Pioch | 18—4X |
| 3,081,487 | 3/1963 | Heffner et al. | 18—4 |
| 3,164,863 | 1/1965 | Hunt. | |

J. SPENCER OVERHOLSER, Primary Examiner

R. L. SPICER, Jr., Assistant Examiner